US012328802B2

United States Patent
Stanek et al.

(10) Patent No.: US 12,328,802 B2
(45) Date of Patent: Jun. 10, 2025

(54) RANGE SENSING AND SAFETY SYSTEM FOR A LUMINAIRE

(71) Applicant: ROBE lighting s.r.o., Roznov pod Radhostem (CZ)

(72) Inventors: Michal Stanek, Valasske Mezirici (CZ); Jan Vilem, Valasske Mezirici (CZ); Tomas David, Podoli (CZ); Jindrich Vavrik, Zubri (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/801,149

(22) Filed: Aug. 12, 2024

(65) Prior Publication Data

US 2024/0407061 A1     Dec. 5, 2024

Related U.S. Application Data

(60) Provisional application No. 63/579,736, filed on Aug. 30, 2023.

(51) Int. Cl.
*H05B 45/10* (2020.01)
*F21V 14/06* (2006.01)
(Continued)

(52) U.S. Cl.
CPC ............. *H05B 45/10* (2020.01); *F21V 14/06* (2013.01); *F21V 14/08* (2013.01); *F21V 21/15* (2013.01);
(Continued)

(58) Field of Classification Search
CPC ......... H05B 45/10; F21V 14/06; F21V 14/08; F21V 21/15; F21V 21/30; G01S 17/10;
(Continued)

(56) References Cited

U.S. PATENT DOCUMENTS 8,610,874 B2 * 12/2013 Venkataraman ... G02B 27/0955
  355/53
2019/0208113 A1   7/2019 Sandstrom et al.
(Continued)

FOREIGN PATENT DOCUMENTS

CN    101918753 A  * 12/2010  .............. F21V 14/00
CN    103941735 A  *  7/2014
(Continued)

OTHER PUBLICATIONS

European Extended Search Report; Application No. 24195254.8; Jan. 21, 2025; 19 pages.

*Primary Examiner* — Abdullah A Riyami
*Assistant Examiner* — Syed M Kaiser
(74) *Attorney, Agent, or Firm* — Conley Rose, P.C.; Brooks W Taylor (57) ABSTRACT

An automated luminaire and method are provided. The automated luminaire includes a range sensing module and a control system. The range sensing module calculates a distance to a closest object in a direction that the automated luminaire is pointed. The control system reduces a beam power density of a light beam emitted from the automated luminaire when the distance is less than a threshold distance. The method includes determining whether an emitted beam power determinant of the automated luminaire has changed; if so, calculating a threshold distance from current values of one or more beam power determinants; determining whether the distance to the closest object is greater than the threshold distance; and, if not, reducing the beam power density of the light beam emitted from the automated luminaire.

18 Claims, 5 Drawing Sheets

(51) Int. Cl.
*F21V 14/08* (2006.01)
*F21V 21/15* (2006.01)
*F21V 21/30* (2006.01)
*F21Y 115/10* (2016.01)
*F21Y 115/30* (2016.01)
*G01S 17/10* (2020.01)
*G01S 17/88* (2006.01)

(52) U.S. Cl.
CPC .............. *F21V 21/30* (2013.01); *G01S 17/10* (2013.01); *G01S 17/88* (2013.01); *F21Y 2115/10* (2016.08); *F21Y 2115/30* (2016.08)

(58) Field of Classification Search
CPC ... G01S 17/88; F21Y 2115/10; F21Y 2115/30
See application file for complete search history.

(56) References Cited

U.S. PATENT DOCUMENTS

| | | | |
|---|---|---|---|
| 2021/0127472 A1 | 4/2021 | Alfier et al. | |
| 2021/0195717 A1 | 6/2021 | Xie et al. | |
| 2021/0291722 A1* | 9/2021 | Kulkarni | ................. G01S 15/58 |
| 2023/0221569 A1* | 7/2023 | Ohyama | ................ B60K 35/00 |
| | | | 701/523 |

FOREIGN PATENT DOCUMENTS

| | | | | | |
|---|---|---|---|---|---|
| CN | 105321379 A | * | 2/2016 | ............. | G01B 21/16 |
| CN | 107076838 A | * | 8/2017 | ............. | G01S 17/10 |
| CN | 116438466 A | * | 7/2023 | .......... | B60W 60/001 |
| KR | 102597506 B1 | * | 1/2023 | .......... | F24F 2120/12 |
| KR | 20230089075 A | * | 6/2023 | ................ | H04N 5/64 |
| WO | WO-2011163091 A1 | * | 12/2011 | ........... | G02B 6/3518 |

\* cited by examiner

RANGE SENSING AND SAFETY SYSTEM FOR A LUMINAIRE

CROSS-REFERENCE TO RELATED APPLICATIONS

This patent application claims the benefit of U.S. Provisional Application No. 63/579,736 filed Aug. 30, 2023, entitled "RANGE SENSING AND SAFETY SYSTEM FOR A LUMINAIRE" which is hereby incorporated by reference in its entirety.

TECHNICAL FIELD OF THE DISCLOSURE

The disclosure generally relates to luminaires, and more specifically to a range sensing and safety system for an automated luminaire.

BACKGROUND

Some luminaires in the entertainment and architectural lighting markets include automated and remotely controllable functions. Such luminaires may be used in theatres, television studios, concerts, theme parks, night clubs and other venues. A luminaire may provide control over the pan and tilt functions of the luminaire allowing the operator to control the direction the luminaire is pointing and thus the position of the light beam on the stage or in the studio. Such position control may be obtained via control of the luminaire's position in two orthogonal rotational axes, which may be referred to as pan and tilt. Some luminaires provide control over other parameters such as intensity, color, focus, beam size, beam shape, and/or beam pattern.

The optical systems of such automated luminaires may be designed to enable a user to control the beam size, from a very narrow output beam to a wider, wash beam. Such control may allow such luminaires to be used with long throws to a target or for almost parallel light effects, as well as for wider, more traditional wash effects. Optical systems with the ability to produce narrow beams may be referred to as 'Beam' optics, while optical systems with the ability to produce wide beams may be referred to as 'Wash' optics.

SUMMARY

In a first embodiment, an automated luminaire includes a range sensing module and a control system. The range sensing module is configured to calculate a measured distance to a closest object in a direction that the automated luminaire is pointed. The control system is configured to receive from the range sensing module the measured distance and reduce an emitted beam power density of an emitted light beam emitted from the automated luminaire when a value of the measured distance is less than a predetermined threshold distance value.

In a second embodiment, an range sensing module is configured to mechanically couple to an automated luminaire; electrically couple to a control system of the automated luminaire; measure a distance to an object in a direction the automated luminaire is pointed; and send the measured distance to the control system of the automated luminaire.

In a third embodiment, a method of controlling an intensity of a beam emitted by an automated luminaire includes determining whether an emitted beam power determinant of the automated luminaire has changed; if the emitted beam power determinant has changed, calculating a threshold distance from current values of one or more beam power determinants; determining whether a measured distance to a closest object in a direction that the automated luminaire is pointed is greater than the threshold distance; and if the measured distance is not greater than the threshold distance, reducing an emitted beam power density of an emitted light beam emitted from the automated luminaire.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Some luminaires (both automated and non-automated) comprise a light source including a discharge lamp or a light emitting diode (LED) array with converging optics. Luminaires according to the disclosure comprise one or more laser based light sources, where a laser LED is used as a pump for a light emitting phosphor. The light source for such a system is designed to be small, with a reduced etendue. In some embodiments, a light source according to the disclosure includes a laser-based light engine that comprises one or more lasers in one or more colors and one or more optical devices that convert a coherent light beam emitted by the laser into an incoherent light beam. Such lasers may include a solid state LED laser. The optical devices may comprise phosphor panels or filters. In some such embodiments, the light engine comprises a solid state LED laser emitting coherent blue light that excites a phosphor to emit incoherent white light.

Luminaires comprising a light source according to the disclosure may comprise a variety of optical systems: a fixed "beam" optical system that produces a narrow beam, a fixed "wash" optical system that produces a wide beam, or a zoom optical system that can change the beam diameter from a narrow beam to a wide beam. Such a zoom optical system may also have the ability to produce good quality imagery from gobos or patterns inserted into the optical train.

Luminaires emitting a very narrow beam (e.g., from a laser-based light source) may emit a light beam having a high emitted beam power density. If the emitted beam power density exceeds certain predetermined threshold power density value, such a beam may cause damage to the eyes or body of persons in the beam, or damage to scenery, structure, or fabrics. For this reason, luminaires emitting such light beams may be subject to various regulatory controls in various jurisdictions.

While the light output from such laser-based light sources is not coherent laser light, it may still have a high emitted beam power density, as discussed above. Luminaires according to the disclosure include methods and systems for satisfying regulatory requirements and mitigating the potential physical problems of an emitted beam of high power density.

Figure 1:
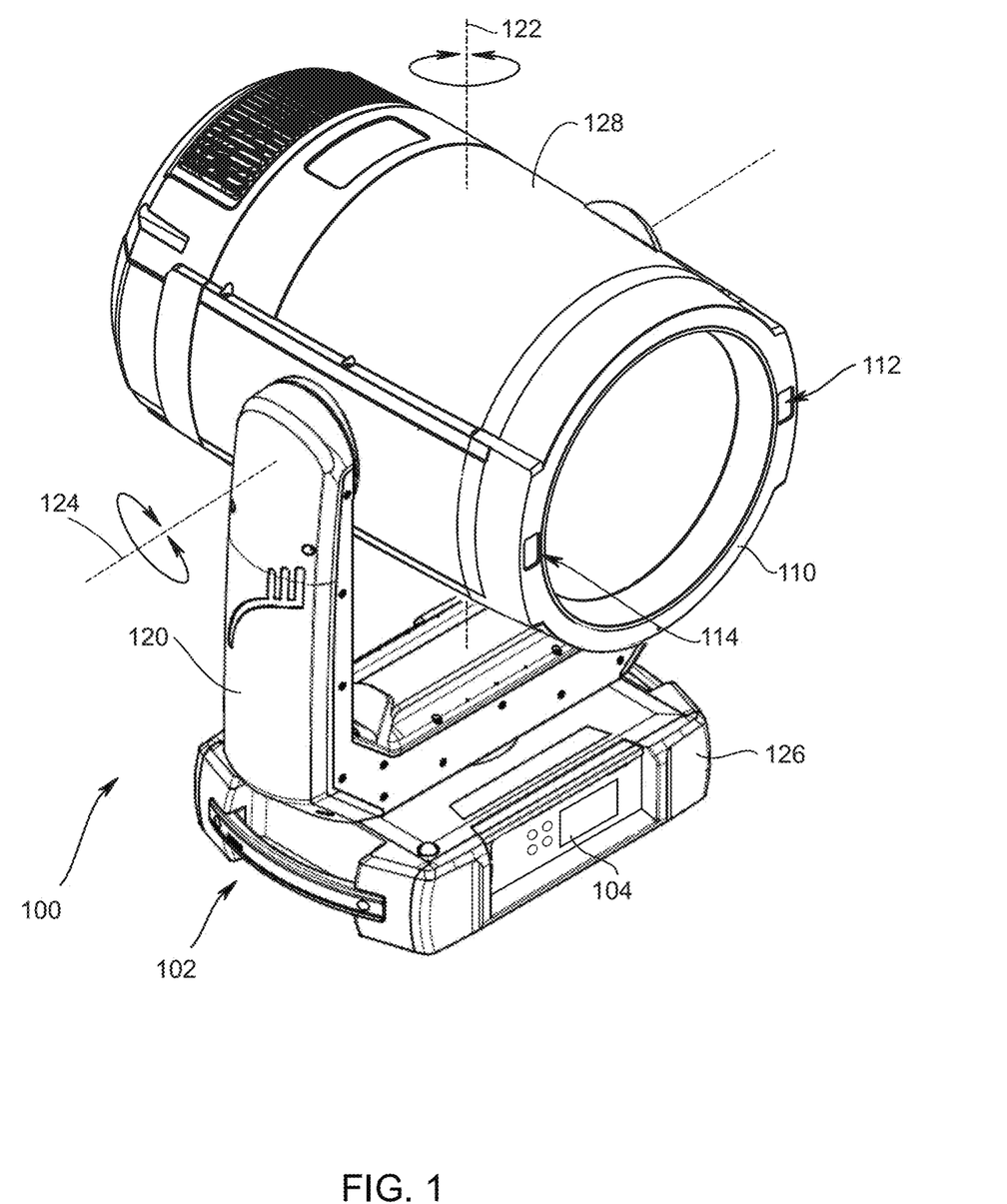
FIG. 1 presents an isometric view of a luminaire according to the disclosure.

FIG. 1 presents an isometric view of a luminaire 100 according to the disclosure. The luminaire 100 is an automated luminaire comprising a head 128 which is coupled to a tilt mechanism to rotate within a yoke 120 about a tilt axis 124. The yoke 120 is coupled to a pan mechanism to rotate relative to a fixed enclosure 126 about a pan axis 122. The pan axis 122 and the tilt axis 124 are orthogonal to each other. An operator of the luminaire 100 is thus able to direct light output from the automated luminaire in a desired direction, through rotation of the head 128 about the pan axis 122 and tilt axis 124. The yoke 120 and the head 128 may be mechanically coupled for rotation about the pan axis 122 and tilt axis 124, respectively, to hand-operated manual controls or may be coupled for motion to motors, linear actuators, or other electromechanically controlled mechanisms for control of an orientation of the yoke 120 and the head 128.

Such electromechanical mechanisms may be electrically coupled to a control system (or controller) 102 of the luminaire 100, the control system 102 configured to control a motion of the electromechanical mechanisms and thus the orientation of the yoke 120 and the head 128. In various embodiments, the control system 102 comprises a microcontroller or other programmable processing system. In some embodiments, the control system 102 may be coupled for local control to a user interface 104 included in the luminaire 100, and configured to receive therefrom signals relating to desired orientations of the yoke 120 and the head 128.

In other embodiments, the control system 102 may be coupled for remote control by a data link (wired or wireless) to a remotely located control console, to receive signals therefrom indicating a desired orientation of the head 128. The data link may use DMX512 (Digital Multiplex) protocol or other suitable communication protocol, e.g., Art-Net, ACN (Architecture for Control Networks), and Streaming ACN. In such embodiments, the control system 102 is configured to move the pan and/or tilt mechanisms in response to signals received via the data link. In some such embodiments, the control system 102 moves the pan mechanism in response to a control signal received on a first control channel of the data link and moves the tilt mechanism in response to a control signal received on a second control channel of the data link.

The luminaire 100 further includes a range sensing module 110 that comprises a first range sensing system 114, electrically coupled to the control system 102. In some embodiments, the range sensing module 110 may further include a second range sensing system 112, also electrically coupled to the control system 102.

Figure 2A:
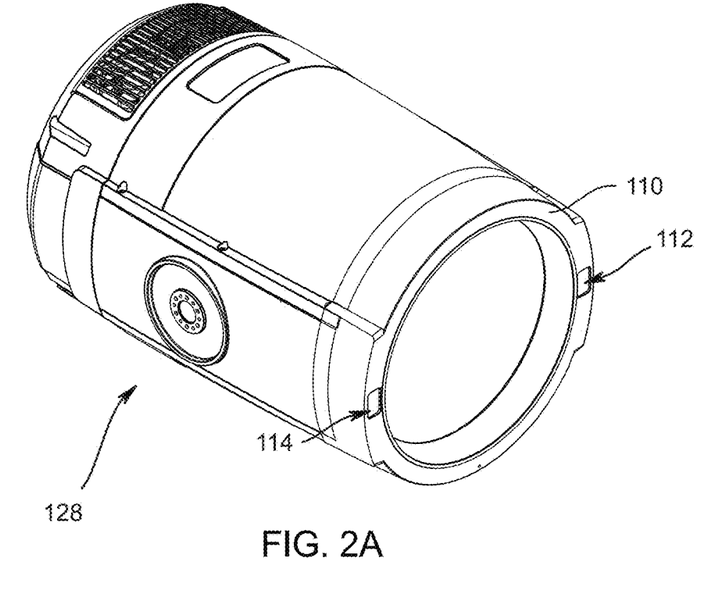
FIG. 2A presents an isometric view of a head of the luminaire of FIG. 1 with a range sensing module according to the disclosure attached to the head.
Figure 2B:
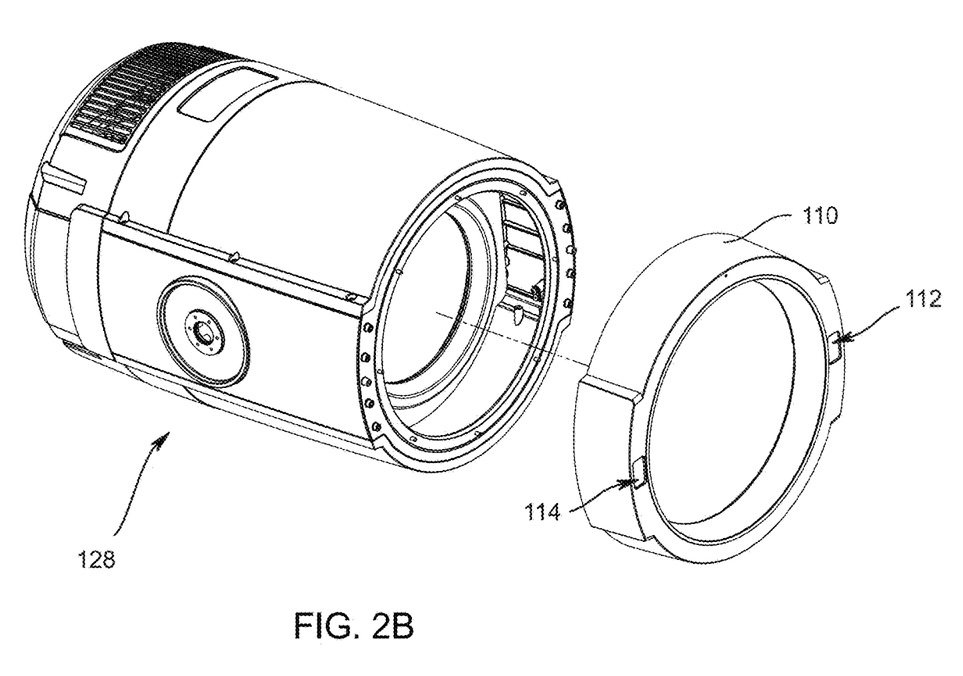
FIG. 2B presents an exploded isometric view of the head of FIG. 2A with the range sensing module detached from the head.

FIG. 2A presents an isometric view of the head 128, with a range sensing module 110 attached. FIG. 2B presents an exploded isometric view of the head 128, with the range sensing module 110 detached. While the range sensing module 110 is shown as mounted to the head 128 of the automated luminaire 100, range sensing modules (and associated luminaire control system safety procedures) according to the disclosure may be used in other embodiments with other types of luminaires (for example, automated and non-automated luminaires, as well as moving and static luminaires).

Figure 3:
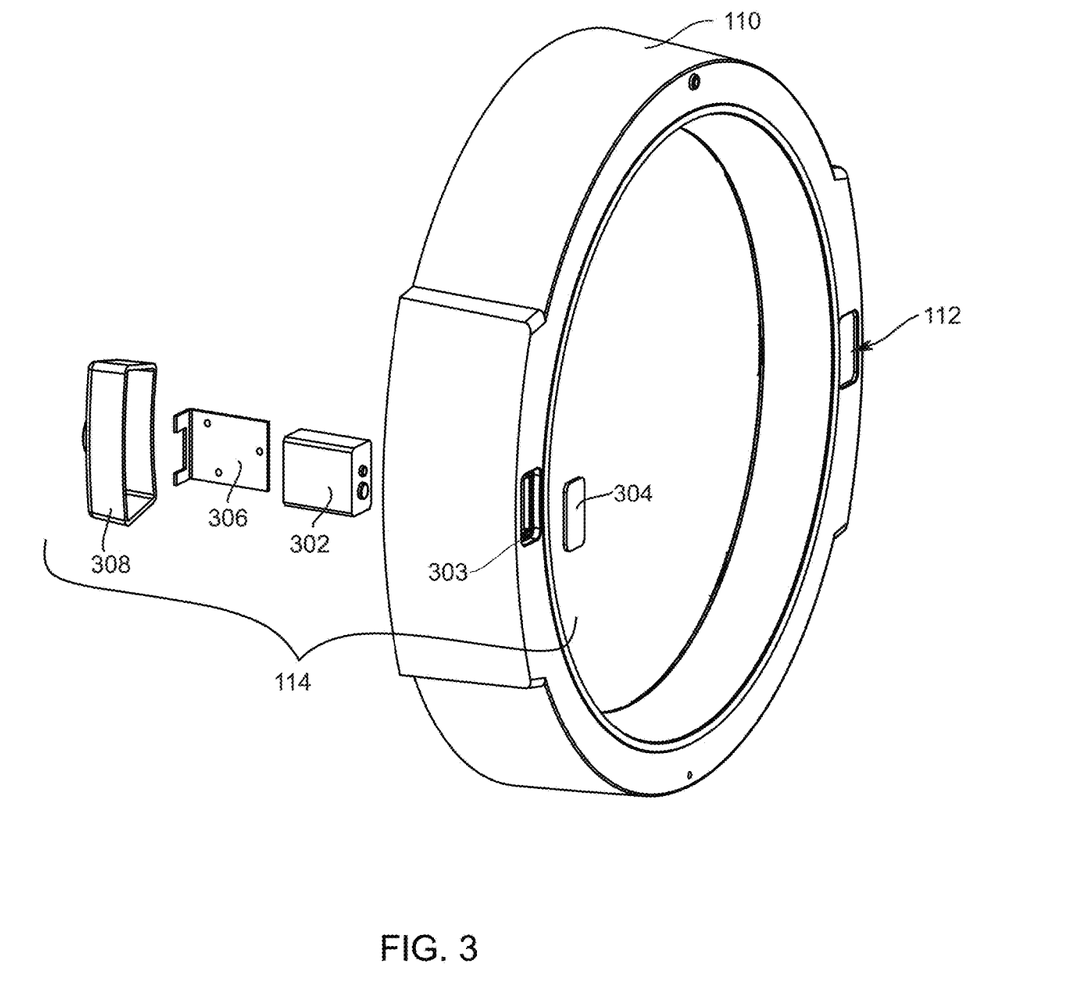
FIG. 3 presents an exploded isometric view of the range sensing module according to the disclosure.

FIG. 3 presents an exploded isometric view of the range sensing module 110. The first range sensing system 114 comprises a first range sensor 302 mounted in an aperture 303 of the range sensing module 110. The first range sensor 302 is mounted behind a window 304, which protects it from airborne materials and moisture. The first range sensor 302 is mounted to the range sensing module 110 by a bracket 306 and covered by a cover 308. The second range sensing system 112 comprises similar components that are not visible in FIG. 3. The range sensing systems 112 and 114 are configured to electrically couple to the control system 102.

In some embodiments, the range sensing systems 112 and 114 may comprise Light Detection and Ranging (LiDAR) range sensors. LiDAR is a method for determining a distance to an object using a measured time-of-flight for a light pulse traveling outwards from the sensor, reflecting off the object, and returning to the sensor. A LiDAR range sensing system is analogous with a Radar system, but uses light rather than radio waves. LiDAR range sensors such as those used in the range sensing systems 112 and 114 may have a measurement range exceeding 150 m (meters) with an accuracy of measurement of a few millimeters. In some embodiments, the range sensing module 110 may include only one of the range sensing systems 112 and 114.

Figure 4:
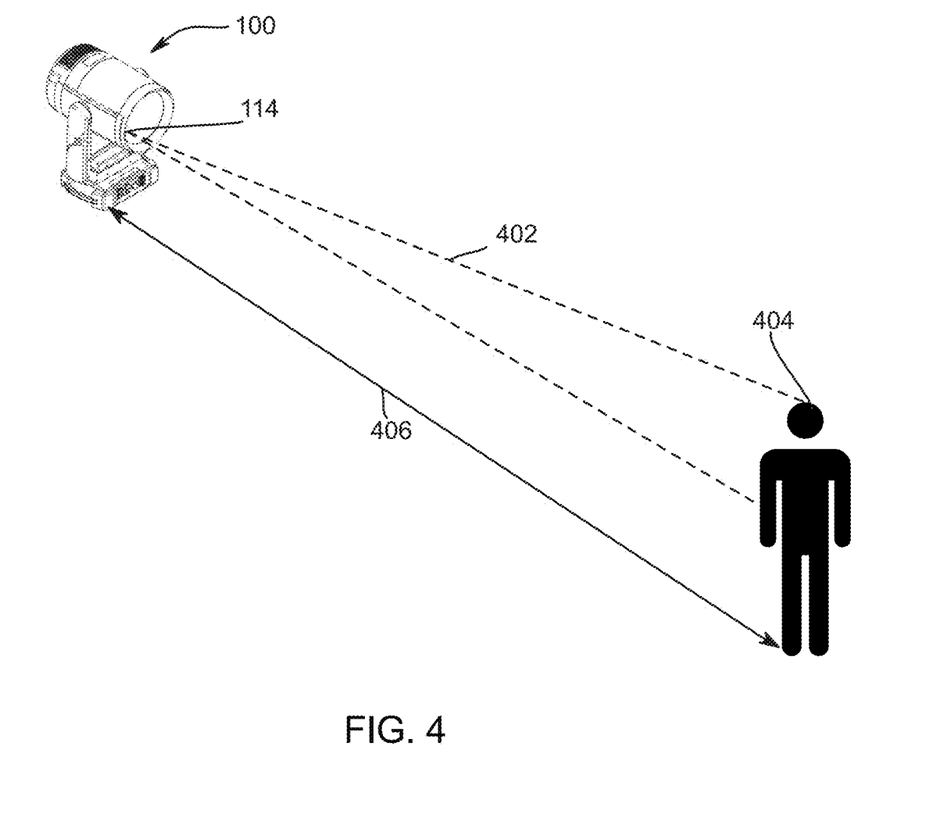
FIG. 4 presents a diagrammatic representation of a range sensing module according to the disclosure in use.

FIG. 4 presents a diagrammatic representation of the range sensing module 110 in use. The first range sensing system 114 emits light pulses 402 continuously and receives reflected light pulses from the closest object in the direction that the luminaire 100 is currently pointed. In FIG. 4 the closest object is the object 404. The first range sensing system 114 calculates a measured distance 406 to the object 404 from a timing between the emission of the pulse and the receipt of the reflected light pulse. The control system 102 is configured to identify the object 404 as the nearest object that a light beam emitted by the luminaire 100 might illuminate. In FIG. 4 the object 404 is shown as a person, however in various applications the object 404 may be a wall, a scenic element, a seating area, or other part of the structure or contents of a performance space.

The first range sensing system 114 continually and repeatedly reports the measured distance 406 to the control system 102. As the luminaire moves—or as objects move in front of the luminaire 100—the object 404 may move or be moved out of the light beam and a new object move or be moved into the light beam, resulting in the first range sensing system 114 reporting to the control system 102 a new measured distance 406 from the luminaire 100 to the new, closest object.

In some embodiments, the control system 102 is configured to scan the pan and tilt mechanisms of the luminaire 100 through all (or some) possible pan/tilt positions to determine "no-go" pan/tilt positions in which the luminaire 100 is pointed at an object having a measured distance 406 that is less than a threshold distance value. Such positions (or ranges of such positions) may be referred to as intensity-controlled ranges. In other embodiments, as discussed in more detail below, an operator of the luminaire 100 identifies intensity-controlled ranges. In various embodiments, such intensity-controlled ranges are stored in a memory of the control system 102 in a look up table or other data structure. A luminaire is considered to be in an intensity-controlled range when both its pan position is in the pan position or range of pan positions of the intensity-controlled range and its tilt position is in the tilt position or range of tilt positions of the intensity-controlled range.

The control system 102 is configured to execute safety procedures to control a light beam emitted by the luminaire 100 based on one or more of (i) a current position of the pan and tilt systems, (ii) a current emitted beam power density of the luminaire 100, and (iii) the measured distance 406 received from the first range sensing system 114. The current emitted beam power density of the light beam may be determined based on a current output power of the light source, losses in the optical system, and a beam angle of the emitted light beam (e.g., calculated based on a configuration of the zoom lens). Devices of the optical system (optical devices) through which the beam passes before being emitted from the luminaire 100 and whose configuration may affect the current emitted beam power density include color filters, gobos, neutral density filters, and an intensity iris.

In some embodiments, if the luminaire 100 is currently emitting light at a beam angle below a predetermined threshold angle (e.g., where a resulting power density in the beam is high enough to be subject to regulatory limits), the control system 102 is configured to reduce or disable the light output from the luminaire 100 if the measured distance 406 is less than the threshold distance value. Only if the measured distance 406 is greater than the threshold distance value will the safety procedures of the control system 102 allow full light output from the luminaire 100.

In some embodiments, such range sensing and safety procedures operate at all times that the luminaire 100 is powered up. In this way, even during set-up, when scenery, seating area, or other parts of the structure are being prepared for performance and/or when workers are on stage, the control system 102 is configured, upon detection of an object with a measured distance 406 less than the threshold distance value, to reduce or disable the light output. A value of the threshold distance may be preset (or predetermined) based on one or both of local regulations and emitted beam power determinants (such as light source power, zoom configuration, and/or optical system configuration). In some embodiments the threshold distance value is repeatedly calculated based on a current emitted beam power density of a beam emitted by the luminaire 100.

Some regulations set a maximum allowable value for emitted beam power density, expressed in Watts per square meter ($W/m^2$)—that is, a ratio of emitted beam power in Watts to an illuminated area. The value of the ratio goes down when an electrical power to the light source is reduced, when the beam is dimmed by other means, or when the beam size is increased (causing the area illuminated by the beam to increase). The beam size may increase due to either or both of an increase in beam angle or an increase in measured distance 406. As an example, if the threshold distance value is set to 10 m when the beam angle is 1° (degree), then it may be increased to 20 m when the beam angle is 4°, and further increased to 30 m when the beam angle is 8°.

In some embodiments, the control system 102 is configured to use a look up table that provides predetermined threshold distance values keyed by current values of one or more of the emitted beam power determinants. Such an embodiment may include a look up table that groups threshold distance values by ranges of values for one or more of the emitted beam power determinants. In other embodiments, the control system 102 is configured to precalculate the predetermined threshold distance value whenever any of the emitted beam power determinants changes.

In some embodiments the range sensing module 110 may comprise a second range sensing system 112, to provide redundancy. In some such embodiments, the control system 102 is configured to compare the measured distances 406 reported by the range sensing systems 112 and 114 and uses the closer measured distance 406. In other such embodiments, the control system 102 is configured to use the measured distance 406 from the second range sensing system 112 if it determines that the first range sensing system 114 has failed. In still other such embodiments, if both range sensing systems 112 and 114 fail (or provide measured distances 406 that differ by more than a threshold difference), the control system 102 completely shuts down operation of the luminaire 100, per its safety procedures.

In some embodiments, zoom and/or focus lens mechanisms of the luminaire 100 comprise one or more lens position sensors configured to sense actual lens positions of the lenses within the luminaire 100, separate from sensors in the zoom and focus lens positioning mechanisms. In such embodiments, the control system 102 is configured to determine, from values of the one or more lens position sensors, whether the luminaire 100 is actually emitting a light beam having a beam angle commanded by the control system 102. Such a situation might arise, for example, if a lens positioning mechanism associated with the lens position sensor has lost calibration or is not operating properly. If the actual beam angle of the emitted beam is different than the commanded beam angle, the control system 102 is configured to determine whether to reduce the emitted beam power density of the light beam emitted from the luminaire 100

In some embodiments, the pan and tilt positioning mechanisms (luminaire head orientation mechanisms) of the luminaire 100 similarly comprise orientation sensors configured to sense an actual orientation of the luminaire head 128. Such orientation sensors are separate from sensors in associated luminaire head motion mechanisms. In still other embodiments, the luminaire head 128 may comprise accelerometers configured to sense an orientation of the luminaire head 128 relative to the ground and/or the performance space. In such embodiments, the control system 102 is configured to determine, from a value of the sensed actual current orientation of the luminaire head 128, whether the luminaire head 128 is actually in an orientation commanded by the control system 102. If the control system 102 determines that the sensed actual current orientation of the luminaire head 128 is different than the orientation commanded by the control system 102, the control system 102 is configured to reduce the emitted beam power density of the light beam emitted from the luminaire 100 (e.g., if the pan and tilt positioning mechanisms were to fail or the luminaire head 128 were to be physically moved out of position).

The control system 102 may be configured to use the measured distance 406 from the range sensing module 110 and any or all of the pan/tilt orientation commanded by the control system 102, the absolute position data, and/or the accelerometer data to build a three-dimensional (3D) model of the performance space, from the point of view of the luminaire 100. Such a 3D model may be built by the control system 102 moving the luminaire head 128 through all or a subset of its orientations and storing the measured distance 406 at some or all of those orientations. In this way, an expected distance lookup table or other data structure may be created to enable the control system 102 to determine from a commanded pan/tilt orientation an expected object distance at that orientation. Such a value of expected distance may be used to check a currently measured distance 406 from the range sensing module 110 for correctness or to check whether the 3D model is still an accurate model of the environment of the luminaire 100.

In some embodiments, the control system 102 is configured to display such a 3D model to an operator of the luminaire 100, for the operator's use in identifying intensity-controlled areas in the performance space—for example a nearby section of the audience—where a narrow angle light beam can never be projected, for safety reasons. In some such embodiments, the control system 102 is configured to send the 3D model to an external device, where the operator may interact with a display of the 3D model to identify intensity-controlled areas in the performance space. In such embodiments, the control system 102 is further configured to receive from the external device information identifying the "intensity-controlled" areas in the performance space and use such received information to define intensity-controlled pan/tilt positions or ranges to, as discussed above. In some such embodiments, safety procedures implemented by the control system 102 may reduce beam intensity—regardless of a currently measured distance 406 from the range sensing module 110—when an "intensity-controlled" pan/tilt position is commanded by an operator of the luminaire 100.

Safety procedures implemented by the control system 102 of the luminaire 100 provide a range sensing and safety system according to the disclosure using the range sensing module 110 and, in some embodiments, actual current position feedback on zoom and focus lens mechanisms, actual position feedback on pan/tilt mechanism positioning, and/or accelerometers monitoring the actual orientation of the luminaire head 128.

Figure 5:
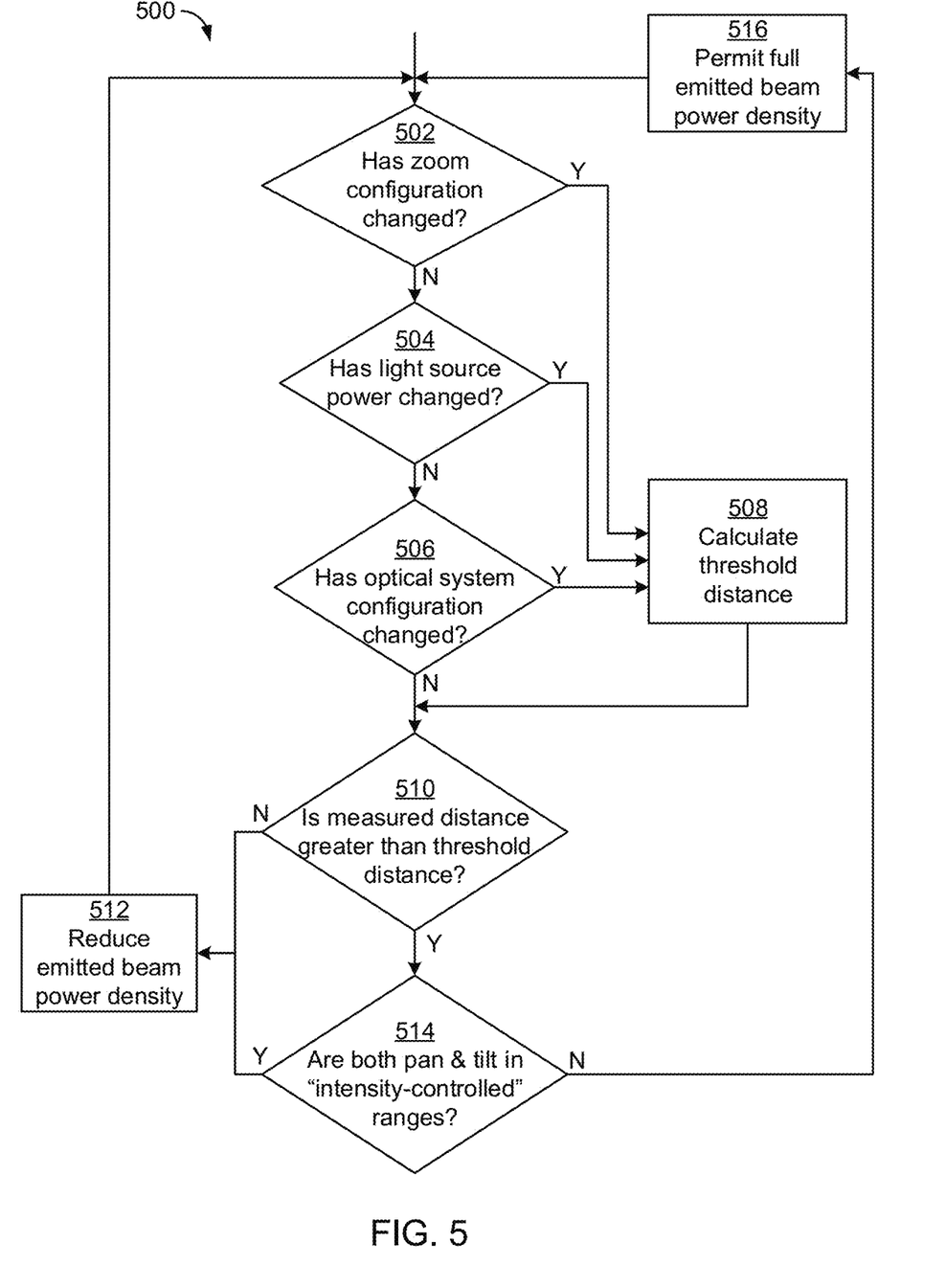
FIG. 5 presents a flow chart of a process for controlling intensity of a light beam emitted from a luminaire according to the disclosure.

FIG. 5 presents a flow chart of a process for controlling intensity of a light beam emitted from a luminaire according to the disclosure. The process begins by checking emitted beam power determinants for changed values: zoom configuration, light source power, and optical system configuration. Such a change could cause the control system 102 to reduce the emitted beam power density or to permit its return to full intensity. In steps 502, 504, and 506, respectively, the control system 102 checks for a change in the configuration of the zoom lens system, the power applied to the light source, and the configuration of optical devices of the optical system. If a change in any of these emitted beam power determinants is detected, the method 500 continues in step 508, where the control system 102 calculates and stores a minimum allowable threshold distance value for a current emitted beam power density of the beam emitted by the luminaire 100. The threshold distance value is a minimum distance from the luminaire at which the emitted beam power density of the emitted light beam is below a predetermined threshold power density value. The control system 102 performs the calculation using current values of all of the configuration of the zoom lens system, the power applied to the light source, and the configuration of the optical devices of the optical system. As discussed below, if a distance to an object in the beam is less than the calculated threshold distance value, the control system 102 reduces the emitted beam power density of the beam to a safer, predetermined emitted beam power density.

In some embodiments, the control system 102 controls a variable power applied to the light source by current control or pulse width modulation (PWM) of voltage. In such embodiments, in step 504, the control system 102 checks whether a value of the variable power applied to the light source has changed. In other embodiments, the control system 102 controls only whether power is applied to the light source—on/off control. In such embodiments, in step 504, the control system 102 checks whether the light source has been powered on or powered off since a previous iteration of the method 500.

As discussed above, regulations may mandate a maximum allowable value for emitted beam power density, expressed in $W/m^2$. The emitted beam power density goes down when an electrical power to the light source is reduced, when the beam is dimmed by a configuration of the optical system, or when the configuration of the zoom lens system increases the emitted beam size, causing the area illuminated by the beam to increase. The beam size also increases with increasing distance from the luminaire 100. Thus, a minimum allowable threshold distance may be calculated beyond which the emitted beam is safe and below which the emitted beam is not considered safe.

Returning to FIG. 5, in step 510, the control system 102 determines whether the measured distance 406 is greater than the stored threshold distance value. Step 510 is performed either after calculating and storing a threshold distance value in step 508 or after determining in steps 502, 504, and 506 that no emitted beam power determinant has changed. If the control system 102 determines in step 510 that the measured distance 406 is not greater than the stored threshold distance value, in step 512 the control system 102 reduces the emitted beam power density to obtain safer operation of the luminaire 100. In some embodiments, the emitted beam is blocked physically by a shutter or other means. In other embodiments, the power applied to the light source is reduced and/or the emitted beam is increased in size (wider beam angle). The actions performed in step 512 result in no emitted beam or an emitted beam that is safe at any distance from the luminaire 100. From step 512, the control system 102 proceeds to step 502 to begin another iteration of the method 500.

If the control system 102 determines in step 510 that the measured distance 406 is greater than the stored threshold distance value, in step 514, the control system determines whether both pan and tilt positions are within respective "intensity-controlled" ranges, as discussed above. If both pan and tilt positions are within their respective "intensity-controlled" ranges, the method 500 proceeds to step 512, where the control system 102 reduces the emitted beam power density to obtain safer operation of the luminaire 100. If one or both of the pan and tilt positions are outside their respective "intensity-controlled" ranges, in step 516 the control system 102 removes any reduction in the emitted beam power density previously imposed in step 512, permitting the luminaire to return to full emitted beam power density. Thus, two conditions are determined before the control system 102 permits the luminaire to return to its full emitted beam power density: (i) the measured distance 406 is greater than the stored threshold distance value and (ii) the pan and tilt positions are not both within their respective "intensity-controlled" ranges.

In step 516, any or all of the following actions may be performed to permit the luminaire to return to its full emitted beam power density: a physical blockage of the emitted beam is removed, a power applied to the light source is returned to a higher, commanded level, and the optical system is moved from a safe configuration to a commanded beam angle. From step 516, the control system 102 proceeds to step 502 to begin another iteration of the method 500.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. An automated luminaire comprising:
   a range sensing module configured to emit first light pulses in a first direction along a first axis to calculate a measured distance to a closest object in the first direction; and
   a control system configured to:
      receive from the range sensing module the measured distance; and
      reduce an emitted beam power density of a second emitted light beam emitted from the automated luminaire along a second axis when a value of the measured distance is less than a predetermined threshold distance value, wherein the first axis and the second axis are not coaxial.

2. The automated luminaire of claim 1, wherein the range sensing module comprises a Light Detection and Ranging (LiDAR) range sensor.

3. The automated luminaire of claim 1, wherein the second emitted light beam is an incoherent light beam emitted by a light emitting phosphor optically pumped by a laser LED.

4. The automated luminaire of claim 1, wherein the control system is configured to calculate the predetermined threshold distance value as a minimum distance from the luminaire at which the emitted beam power density of the second emitted light beam is below a predetermined threshold power density value.

5. The automated luminaire of claim 1, wherein the control system is configured to calculate the predetermined threshold distance value from one or more of: (i) a configuration of a zoom lens system configured to control a beam angle of the second emitted light beam, (ii) a power applied to a light source configured to generate the second emitted light beam, and (iii) a configuration of an optical system through which the second emitted light beam passes before being emitted from the automated luminaire.

6. The automated luminaire of claim 5, wherein the control system is configured to calculate the predetermined threshold distance value using a look up table comprising threshold distance values keyed by one or more of the zoom lens system configuration, the power applied to the light source, and the optical system configuration.

7. The automated luminaire of claim 1, wherein the control system is configured to reduce the emitted beam power density of the second emitted light beam by altering a configuration of emitted beam power determinants to a configuration selected as causing the luminaire to emit a beam having a predetermined emitted beam power density,
   wherein the emitted beam power determinants comprise one or more of: (i) a zoom lens system configured to control a beam angle of the second emitted light beam, (ii) a power applied to a light source configured to generate the second emitted light beam, and (iii) a configuration of an optical system through which the second emitted light beam passes before being emitted from the automated luminaire.

8. The automated luminaire of claim 1, wherein the control system is configured to reduce the emitted beam power density of the second emitted light beam by physically blocking the light beam.

9. The automated luminaire of claim 1, further comprising:
   a lens position sensor in a lens mechanism of the automated luminaire, the lens position sensor configured to sense an actual lens position of the lens mechanism, wherein the lens position sensor is separate from sensors in an associated lens positioning mechanism,
   wherein the control system is configured to:
      determine, based on a value of the lens position sensor, whether the second emitted light beam has a beam angle commanded by the control system; and
      reduce the emitted beam power density of the second emitted light beam when the second emitted light beam has a beam angle different than the beam angle commanded by the control system.

10. The automated luminaire of claim 1, further comprising:
    an orientation sensor in a luminaire head orientation mechanism of the automated luminaire, the orientation sensor configured to sense an actual current orientation of a head of the automated luminaire, wherein the orientation sensor is separate from sensors in an associated luminaire head motion mechanism,
    wherein the control system is configured to:
       determine, based on a value of the orientation sensor, whether the head of the automated luminaire has an orientation commanded by the control system; and
       reduce the emitted beam power density of the second emitted light beam when the orientation of the head of the automated luminaire is different than the orientation commanded by the control system.

11. A range sensing module configured to:
    mechanically couple to an automated luminaire configured to emit a first light beam in a first direction along a first axis;
    electrically couple to a control system of the automated luminaire;
    emit light pulses in the first direction along a second axis to measure a distance to an object in the first direction, wherein the first axis and the second axis are not coaxial; and
    send the measured distance to the control system of the automated luminaire.

12. The range sensing module of claim 11, wherein the range sensing module comprises a Light Detection and Ranging (LiDAR) range sensing system configured to electrically couple to the control system of the automated luminaire.

13. The range sensing module of claim 12, wherein the LiDAR range sensing system is configured to emit light pulses and receive reflected light pulses through an aperture in the range sensing module, wherein the aperture comprises a window configured to protect the LiDAR range sensing system from airborne materials and moisture.

14. The range sensing module of claim 12, wherein the range sensing module comprises a second LiDAR range sensing system configured to electrically couple to the control system of the automated luminaire.

15. A method of controlling an intensity of a first light beam emitted along a first axis by an automated luminaire, the method comprising:
    determining whether an emitted beam power determinant of the automated luminaire has changed;
    if the emitted beam power determinant has changed, calculating a threshold distance from current values of one or more beam power determinants;
    calculating by a range sensing module, configured to emit light pulses in a second direction along a second axis, a measured distance to a closest object in the second direction, wherein the first axis and the second axis are not coaxial;

determining whether the measured distance is greater than the threshold distance; and if the measured distance is not greater than the threshold distance, reducing an emitted beam power density of the first light beam.

16. The method of claim 15, further comprising:

if the measured distance is greater than the threshold distance, determining whether both a pan position and a tilt position of the automated luminaire are in an intensity-controlled range;

if both the pan position and the tilt position are in the intensity-controlled range, reducing the emitted beam power density; and if both the pan position and the tilt position are not in intensity-controlled ranges, permitting the emitted first light beam to return to a full emitted beam power density.

17. The method of claim 16, wherein reducing the emitted beam power density comprises one or more of:

physically blocking the emitted first light beam;

reducing a power applied to a light source of the automated luminaire; and increasing a beam angle of the emitted first light beam.

18. The method of claim 16, wherein permitting the emitted first light beam to return to the full emitted beam power density comprises one or more of:

removing a physical blockage of the emitted first light beam;

applying a commanded level of power to a light source of the automated luminaire; and moving an optical system of the automated luminaire to produce a commanded beam angle.

* * * * *